United States Patent
Lee et al.

(10) Patent No.: US 9,105,940 B2
(45) Date of Patent: Aug. 11, 2015

(54) ELECTROLYTE MEMBRANE FOR LITHIUM BATTERY, LITHIUM BATTERY USING THE ELECTROLYTE MEMBRANE, AND METHOD OF PREPARING THE ELECTROLYTE MEMBRANE

(75) Inventors: Jeong-hee Lee, Seongnam-si (KR); Seoung-jae Im, Seoul (KR); Sang-ho Park, Yongin-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 608 days.

(21) Appl. No.: 13/032,332

(22) Filed: Feb. 22, 2011

(65) Prior Publication Data

US 2012/0077092 A1 Mar. 29, 2012

(30) Foreign Application Priority Data

Sep. 27, 2010 (KR) ........................ 10-2010-0093297

(51) Int. Cl.
| | |
|---|---|
| H01M 10/056 | (2010.01) |
| C08J 5/22 | (2006.01) |
| H01B 1/12 | (2006.01) |
| H01M 10/052 | (2010.01) |
| H01M 10/0565 | (2010.01) |
| H01M 10/0525 | (2010.01) |

(52) U.S. Cl.
CPC ............ *H01M 10/056* (2013.01); *C08J 5/2206* (2013.01); *C08J 5/2231* (2013.01); *H01B 1/122* (2013.01); *H01M 10/052* (2013.01); *H01M 10/0565* (2013.01); *C08J 2333/12* (2013.01); *H01M 10/0525* (2013.01); *Y02E 60/122* (2013.01)

(58) Field of Classification Search
CPC .............................. C08J 5/2206; C08J 5/2231
See application file for complete search history.

(56) References Cited

U.S. PATENT DOCUMENTS

| | | | | |
|---|---|---|---|---|
| 5,229,225 | A | * | 7/1993 | Shackle ......................... 429/311 |
| 5,545,496 | A | * | 8/1996 | Chang et al. ................ 429/231.5 |
| 2004/0038133 | A1 | * | 2/2004 | Yamaguchi et al. ........... 429/326 |
| 2008/0261101 | A1 | * | 10/2008 | de Figueiredo Gomes et al. ................................ 429/33 |
| 2009/0065730 | A1 | * | 3/2009 | Yoshino et al. .............. 252/62.2 |
| 2009/0272934 | A1 | * | 11/2009 | Chittibabu et al. .......... 252/62.2 |
| 2011/0123877 | A1 | * | 5/2011 | Matsumoto et al. .......... 429/405 |

FOREIGN PATENT DOCUMENTS

| | | | | |
|---|---|---|---|---|
| KR | 1020080093020 A | | 10/2008 | |
| WO | WO 2009025176 | * | 2/2009 | .............. B01J 31/06 |
| WO | 2009133366 A2 | | 11/2009 | |

OTHER PUBLICATIONS

Mueller: "Metal-Organic Frameworks—Prospective Industrial Applications", U. Mueller, M. Schubert, F. Teich, H. Putter, K. Schierle-Arndt and J. Pastre, J. Mater. Chem., 16, 626-36 (2006).*

(Continued)

*Primary Examiner* — Jeremiah Smith
(74) *Attorney, Agent, or Firm* — Cantor Colburn LLP (57) ABSTRACT

An electrolyte membrane for a lithium battery, the electrolyte membrane including: a matrix including a polymerization product of a (meth)acrylate monomer composition; and a porous metal-organic framework dispersed in the matrix, wherein the metal-organic framework includes a crystalline compound including a metal ion or metal ion cluster which is chemically bound to an organic ligand, and a liquid electrolyte including a lithium salt and a nonaqueous organic solvent.

24 Claims, 6 Drawing Sheets

(56) References Cited

OTHER PUBLICATIONS

Combelles, C. et al., Structural, magnetic and redox properties of a new cathode material for Li-ion batteries: the iron-based metal organic framework, Ionics, 2008, vol. 14, No. 4; 279-283.

Serre et al., Synthesis, characterisation and luminescent properties of a new three-dimensional lanthanide trimestate: M((C6H3)—(CO2)3) (M=Y, Ln) or MIL-78, Journal of Materials Chemistry, vol. 14, 2004, pp. 1540-1543.

Tranchemontagne et al., "Room temperature synthesis of metal-organic frameworks: MOF-5, MOF-74, MOF-177, MOF-199, and IRMOF-0", Tetrahedron, vol. 64, 2008, pp. 8553-8557.

* cited by examiner

ELECTROLYTE MEMBRANE FOR LITHIUM BATTERY, LITHIUM BATTERY USING THE ELECTROLYTE MEMBRANE, AND METHOD OF PREPARING THE ELECTROLYTE MEMBRANE

CROSS-REFERENCE TO RELATED APPLICATIONS

This application claims priority to Korean Patent Application No. 10-2010-0093297, filed on Sep. 27, 2010, and all the benefits accruing therefrom under 35 U.S.C. §119, the content of which in its entirety is herein incorporated by reference.

BACKGROUND

1. Field

The present disclosure relates to an electrolyte membrane for a lithium battery, a lithium battery using the electrolyte membrane, and a method of preparing the electrolyte membrane. More particularly, the present disclosure relates to an electrolyte membrane for a lithium battery that has good lithium ion conductivity and is structurally stable.

2. Description of the Related Art

Lithium secondary batteries are rechargeable at high rates and have energy densities that are about three times higher than conventional lead storage batteries, nickel-cadmium ("Ni—Cd") batteries, nickel-hydrogen batteries, or nickel-zinc batteries.

According the type of electrolyte, lithium secondary batteries may be classified as either a liquid electrolyte battery or a polymer electrolyte battery. In general, batteries using liquid electrolytes are called lithium ion batteries, and batteries using polymer electrolytes are called lithium polymer batteries.

Safety issues with lithium ion batteries, such as a risk of fire or explosion caused by an organic solvent of the liquid electrolyte, have led to a growing desire to use polymer electrolytes.

However, it is currently impractical to use a polymer electrolyte in a lithium ion battery because currently available polymer electrolytes have a lithium ion conductivity of $10^{-5}$ Siemens per centimeter ("S/cm") or less.

A liquid electrolyte impregnated in a polymer gel may provide a lithium ion conductivity of about $10^{-3}$/cm. However, if a degree of hardness of the polymer gel is increased to provide sufficient structural stability, the lithium ion conductivity may decrease by about 10 to 100 times. Thus there remains a need for an improved electrolyte membrane that provides improved lithium ion conductivity and safety.

SUMMARY

Provided is a novel electrolyte membrane for a lithium battery.

Provided is a lithium battery including the electrolyte membrane.

Provided is a method of preparing the electrolyte membrane for the lithium battery.

According to an aspect, disclosed is an electrolyte membrane for a lithium battery, the electrolyte membrane including: a matrix including a polymerization product of a (meth)acrylate monomer composition; and a metal-organic framework dispersed in the matrix, wherein the metal-organic framework includes a porous crystalline compound including a metal ion or metal ion cluster which is chemically bound to an organic ligand, and a liquid electrolyte including a lithium salt and a nonaqueous organic solvent.

The metal-organic framework may include pores, which retain the liquid electrolyte.

The pores may have an average diameter of about 0.5 to about 3 nanometers (nm).

According to another aspect, disclosed is a lithium battery including: a positive electrode; a negative electrode; and an electrolyte, wherein the electrolyte is a membrane including a matrix including a polymerization product of a (meth)acrylate monomer composition, and a metal-organic framework dispersed in the matrix, wherein the metal-organic framework includes a porous crystalline compound including a metal ion or metal ion cluster which is chemically bound to an organic ligand, and a liquid electrolyte including a lithium salt and a nonaqueous organic solvent.

According to another aspect, disclosed is a method of manufacturing an electrolyte membrane for a lithium battery, the method including: combining a metal-organic framework, a (meth)acrylate monomer composition, and a solvent to obtain a mixture; coating the mixture on a substrate to form a coated layer; polymerizing the coated layer to provide a polymerized layer; and impregnating the polymerized layer with a lithium salt and a nonaqueous organic solvent to manufacture the electrolyte membrane.

Additional aspects will be set forth in part in the description which follows, and in part will be apparent from the description.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description, and will fully convey the scope of the invention to those skilled in the art.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, "a combination thereof" refers to a combination comprising one or more of the named constituents, components, compounds, or elements, optionally together with a like constituent, component, compound, or element not named.

As used herein, the term "monomer" refers to a chemical moiety capable of polymerization, and includes both monomers (e.g., trimethylolpropane trimethacrylate) and oligomers (e.g., a poly(ethyleneglycol) diacrylate). A "monomer composition" can include a monomer, an oligomer, or a combination thereof.

The term "(meth)acrylate" as used herein is inclusive of both acrylates and methacrylates.

According to an exemplary embodiment, an electrolyte membrane for a lithium battery comprises a matrix comprising a polymerization product of a (meth)acrylate monomer composition, and a metal-organic framework dispersed in the matrix.

Figure 1:
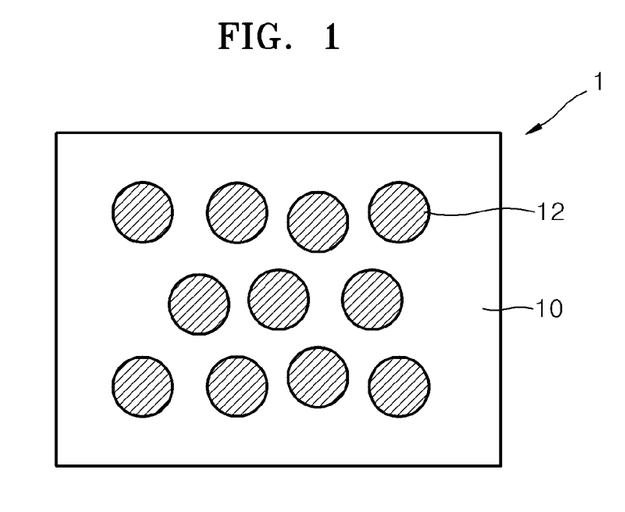
FIG. 1 is a schematic illustration of an embodiment of an electrolyte membrane for a lithium battery.

FIG. 1 is a schematic illustration of an embodiment of an electrolyte membrane 1.

The electrolyte membrane 1 includes a matrix 10 and a metal-organic framework 12.

The matrix 10 comprises a polymerization product of a (meth)acrylate monomer composition, and may be formed by thermal polymerization or irradiation of the (meth)acrylate monomer composition. The irradiation may include irradiation with ultraviolet light, for example.

The matrix 10 may include a polymerization product of a (meth)acrylate monomer composition. Suitable (meth)acrylates may include mono(meth)acrylates, di(meth)acrylates, tri(meth)acrylates, tetra(meth)acrylates, or a combination thereof.

A suitable di(meth)acrylate may include a poly(ethyleneglycol) diacrylate ("PEGDA"), a poly(propyleneglycol) diacrylate ("PPGDA"), a poly(ethyleneglycol) dimethacrylate ("PEGDMA"), a poly(propyleneglycol) dimethacrylate ("PPGDMA"), a poly(ethyleneglycol)urethane diacrylate, a poly(ethyleneglycol)urethane dimethacrylate, a polyester diacrylate, a polyester dimethacrylate, or a combination thereof. A suitable tri(meth)acrylate may include a poly(ethyleneglycol)urethane triacrylate, a poly(ethyleneglycol)urethane trimethacrylate, trimethylolpropane triacrylate, trimethylolpropane trimethacrylate, an ethoxy-substituted trimethylolpropane triacrylate, a propoxy-substituted trimethylolpropane triacrylate, glyceryl triacrylate, glyceryl trimethacrylate, or a combination thereof. A suitable tetra(meth)acrylate may include tetramethylolpropane tetraacrylate, di(trimethylolpropane)tetraacrylate, or a combination thereof.

In an embodiment, the (meth)acrylate monomer composition for forming the matrix 10 may include a di(meth)acrylate, optionally with no other (meth)acrylates present. In an embodiment, the (meth)acrylate monomer composition for forming the matrix 10 may include a poly(ethyleneglycol) diacrylate ("PEGDA"), a poly(propyleneglycol) diacrylate ("PPGDA"), a poly(ethyleneglycol) dimethacrylate ("PEGDMA"), a poly(propyleneglycol) dimethacrylate ("PPGDMA"), or a combination thereof, optionally with no other (meth)acrylates present.

The metal-organic framework 12 dispersed in the matrix 10 may include a porous crystalline compound. The metal-organic framework 12 may be formed by chemically bonding metal ions and/or metal ion clusters together with an organic ligand.

A suitable metal ion for forming the metal-organic framework 12 includes any metal ion that can form a coordinate

(i.e., dative) bond or a covalent bond. In an embodiment, the metal ion for forming the metal-organic framework 12 may include $Zn^{2+}$, $Ti^{4+}$, $V^{4+}$, $V^{3+}$, $V^{2+}$, $Y^{3+}$, $Zr^{4+}$, a trivalent lanthanide, or a combination thereof, and may further optionally include an oxo-centered metal ion cluster which includes at least one of the foregoing metal ions.

The metal ion of the metal-organic framework 12 may be electrically stable and may not be oxidized or reduced during charging and/or discharging of lithium ions. In an embodiment, the metal ion is electrochemically inert (i.e., is not substantially oxidized or reduced) at a potential of about −0.1 to about 5 volts (V), specifically about 0 to about 4.5 V, more specifically about 0.1 to about 4.0 V versus lithium metal.

The organic ligand may include any organic material including a functional group capable of forming a coordinate, ionic, or covalent bond with the metal ions and/or metal ion clusters, and optionally with an organic linker when present. For example, the functional group may be a carboxylic acid group or imidazole group. Compounds with a combination of different functional groups can be used. A suitable organic ligand may include an organic material having at least two binding sites for coordinate, ionic or covalent bonding. For example, the organic material may be bidentate, tridentate, or the like.

In an embodiment, the organic ligand may include an aromatic polycarboxylic acid such as an aromatic dicarboxylic acid, an aromatic tricarboxylic acid, an imidazole compound, or a combination thereof. The aromatic polycarboxylic acid can be monocyclic or polycyclic, and in addition to the carboxylic acid groups, can optionally be substituted with 1 to 3 substituents such as a C1 to C3 alkyl group, a halogen, a nitro group, a cyano group, or a combination thereof. In an embodiment, the aromatic dicarboxylic acid may be a C6 to C30 aromatic dicarboxylic acid, a C7 to C20 aromatic dicarboxylic acid, or a C8 to C15 aromatic dicarboxylic acid; the aromatic tricarboxylic acid may be a C6 to C30 aromatic tricarboxylic acid, a C7 to C20 aromatic tricarboxylic acid, or a C8 to C15 aromatic tricarboxylic acid; and the imidazole compound may be a C3 to C30 imidazole compound, a C4 to C20 imidazole compound, or a C5 to C15 imidazole compound, each of which may be optionally further substituted as described above.

A suitable aromatic dicarboxylic acid or tricarboxylic acid may include benzenedicarboxylic acid, benzenetricarboxylic acid, naphthalene dicarboxylic acid, biphenyldicarboxylic acid, triphenyldicarboxylic acid, a compound represented by Formulas 1 to 3 below:

Formula 1

Formula 2

Formula 3

The metal-organic framework 12 may further comprise a liquid electrolyte comprising a lithium salt and a nonaqueous organic solvent.

The metal-organic framework 12 may also comprise pores in which the liquid electrolyte may be retained. The pores may be located in the porous crystalline compound of the metal-organic framework 12.

The pores may have an average pore diameter of from about 0.5 nanometers (nm) to about 10 nm, and in some embodiments, from about 0.5 nm to about 5 nm, and in some embodiments, from about 0.5 nm to about 3 nm.

If the average pore diameter of the metal-organic framework 12 is within the foregoing ranges, the electrolyte membrane 1, which includes the metal-organic framework 12, may have a stabilized structure. Without being bound by theory, it is believed that the improved stability may be due to interactions between lithium ions of the lithium salt in the liquid electrolyte, the nonaqueous organic solvent, and the metal of the metal-organic framework 12.

Again while not wanting to be bound by theory, it is believed that due to weak atomic bonds between the lithium ions of the lithium salt in the liquid electrolyte, the nonaqueous organic solvent, and the metal of the metal-organic framework 12, the lithium ions in the solvent are movable in the crystalline structure of the metal-organic framework 12, thereby improving lithium ion conductivity of the electrolyte membrane 1.

The lithium salt may include $LiClO_4$, $LiCF_3SO_3$, $LiBF_4$, $LiN(CF_3SO_2)_2$, $LiPF_6$, $LiAsF_6$, $LiSbF_6$, $LiPF_3(CF_2CF_3)_3$, or a combination thereof. However, any suitable lithium salt may be used.

The nonaqueous organic solvent may include ethylene carbonate, propylene carbonate, butylene carbonate, dimethyl carbonate, diethyl carbonate, 1-fluoroethylene carbonate, sulfolane, 1,3-dioxane, γ-butyrolactone, or a combination thereof. However, any suitable nonaqueous organic solvent may be used.

The electrolyte membrane 1 may be flexible, and without being bound by theory, it is believed that the flexibility results from the polymerization product of the (meth)acrylate monomer composition of the matrix 10 and the particles of the metal-organic framework 12, which are dispersed in the matrix 10.

Figure 2:
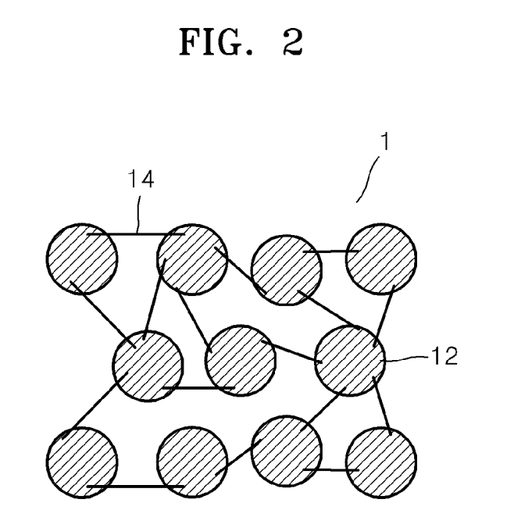
FIG. 2 is a schematic illustration of an embodiment of a metal-organic framework of an electrolyte membrane for a lithium battery, wherein metal ions and/or metal ion clusters are chemically bonded by organic linkers.

FIG. 2 is a schematic illustration of an embodiment of a metal-organic framework 12 of an electrolyte membrane for lithium batteries, wherein a plurality of portions of a metal-organic framework are chemically bonded by an organic linker 14.

Referring to FIG. 2, the metal-organic frameworks 12 are chemically bonded by the reaction residue of an organic linker, as denoted by solid line 14.

The organic linker 14 may include a compound represented by Formula 4 below:

$$X-Y-X.\quad\quad\text{Formula 4}$$

Each organic linker may be the same or different. In Formula 4, each X is a group reactive with the metal ions, the metal ion clusters, or a functional group of the organic ligand of the porous crystalline compound. Each X may independently be an amine group, a hydroxyl group, or a carboxylic acid group. Also in Formula 4, Y is $(CH_2)_n$ or $(CH_2CH_2O)_n$ $CH_2CH_2$; and n is an integer from 9 to 100, specifically 30 to 90, more specifically 50 to 80.

The organic linker may bind at least two portions of a metal-organic framework via the reaction residue of the linker, for example a linker o Formula (4).

Figure 3:
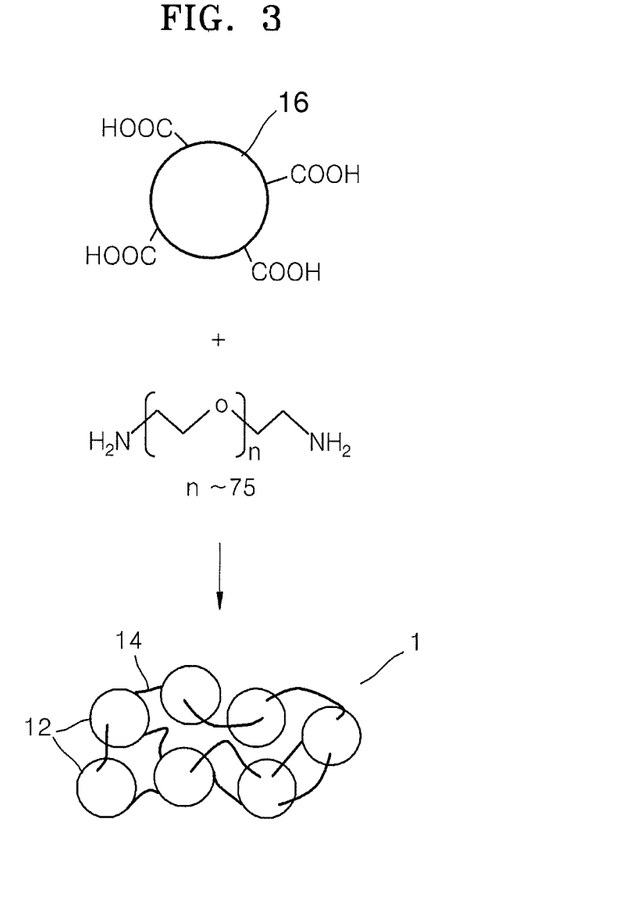
FIG. 3 is a detailed illustration of a method of forming the metal-organic framework chemically bonded by organic linkers of FIG. 2.

FIG. 3 is a more detailed illustration of a method of forming the linked metal-organic framework 12 of FIG. 2.

Referring to FIG. 3, a portion of the metal-organic framework, for example in form of a particle 16 has one or more —COOH group on a particle surface thereof as shown. Reaction with a diamine linker compound with —$NH_2$ groups at opposite terminals forms two —CONH— amide groups by condensation. The reaction residue of the linker including the amide groups may serve as chemical bonds linking adjacent metal-organic frameworks 12.

These chemical bonds covalently bind the metal-organic frameworks 12, thereby increasing structural stability of the electrolyte membrane.

A catalyst may be used to facilitate the covalent bonding. In an embodiment the catalyst may include 3-diethyl-1-ethyl-3-(aminopropyl)carbodiimide ("EDC"), for example. However, any suitable catalyst effective to form a chemical bond between the metal ion, the metal ion cluster, or a functional group of the organic ligand may be used.

According to another exemplary embodiment, a lithium battery includes a positive electrode, a negative electrode, and an electrolyte, wherein the electrolyte comprises, consists essentially of, or consists of a membrane including a matrix comprising a polymerization product of the (meth)acrylate monomer composition, and a metal-organic framework dispersed in the matrix, the metal-organic framework including a porous crystalline compound, and a liquid electrolyte comprising a lithium salt and a nonaqueous organic solvent.

In an embodiment, the porous crystalline compound may comprise a metal ion or a metal ion cluster which is chemically bound to an organic ligand. Also, the lithium battery including the electrolyte membrane disclosed above may have good lithium ion conductivity and high structural stability. In addition, the disclosed electrolyte membrane for lithium batteries may be used in place of or in addition to an electrolyte and a separator of a lithium battery.

The positive electrode may include a current collector and a positive active material layer. The positive active material layer may further include a compound (e.g., a lithiated intercalation compound) which can be reversibly intercalated and deintercalated with lithium. Examples of the compound which can be reversibly intercalated and deintercated with lithium include: $Li_aA_{1-b}X_bD_2$ (wherein $0.95\leq a\leq 1.1$, and $0\leq b\leq 0.5$); $Li_aE_{1-b}X_bO_{2-c}D_c$ (wherein $0.95\leq a\leq 1.1$, $0\leq b\leq 0.5$, and $0\leq c\leq 0.05$); $LiE_{2-b}X_bO_{4-c}D_c$ (wherein $0\leq b\leq 0.5$, and $0\leq c\leq 0.05$); $Li_aNi_{1-b-c}Co_bBcD_\alpha$ (wherein $0.95\leq a\leq 1.1$, $0\leq b\leq 0.5$, $0\leq c\leq 0.05$, and $0<\alpha<2$); $Li_aNi_{1-b-c}Co_bX_cO_{2-\alpha}M_\alpha$, (wherein $0.95\leq a\leq 1.1$, $0\leq b\leq 0.5$, $0\leq c\leq 0.05$, and $0<\alpha<2$); $Li_aNi_{1-b-c}Co_bX_cO_{2-\alpha}M_2$ (wherein $0.95\leq a\leq 1.1$, $0\leq b\leq 0.5$, $0\leq c\leq 0.05$, and $0<\alpha<2$); $Li_aNi_{1-b-c}Mn_bX_cD_\alpha$ (wherein $0.95\leq a\leq 1.1$, $0\leq b\leq 0.5$, $0\leq c\leq 0.05$, and $0<\alpha<2$); $Li_aNi_{1-b-c}Mn_bX_cO_{2-\alpha}M_\alpha$ (wherein $0.95\leq a\leq 1.1$, $0\leq b\leq 0.5$, $0\leq c\leq 0.05$, and $0<\alpha<2$); $Li_aNi_{1-b-c}Mn_bX_cO_{2-\alpha}M_2$ (wherein $0.95\leq a\leq 1.1$, $0\leq b\leq 0.5$, $0\leq c\leq 0.05$, and $0<\alpha<2$); $Li_aNi_bE_cG_dO_2$ (wherein $0.90\leq a\leq 1.1$, $0\leq b\leq 0.9$, $0\leq c\leq 0.5$, and $0.001\leq d\leq 0.1$); $Li_aNi_{b-}Co_cMn_dG_eO_2$ (wherein $0.90\leq a\leq 1.1$, $0\leq b\leq 0.9$, $0\leq c\leq 0.5$, $0\leq d\leq 0.5$, and $0\leq e\leq 0.1$); $Li_aNiG_bO_2$ (wherein $0.90\leq a\leq 1.1$, and $0.001\leq b\leq 0.1$); $Li_aCoG_bO_2$ (wherein $0.90\leq a\leq 1.1$, and $0.001\leq b\leq 0.1$); $Li_aMnG_bO_2$ (wherein $0.90\leq a\leq 1.1$, and $0.001\leq b\leq 0.1$); $Li_aMn_2G_bO_4$ (wherein $0.90\leq a\leq 1.1$, and $0\leq b\leq 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ (wherein $0\leq f\leq 2$); $Li_{(3-f)}FE_2(PO_4)_3$ (wherein $0\leq f\leq 2$); $LiFePO_4$; or lithium titanate. A combination comprising at least one of the foregoing can be used.

In the above formulae, A is nickel (Ni), cobalt (Co), manganese (Mn), or a combination thereof; X is aluminum (Al), nickel (Ni), cobalt (Co), manganese (Mn), chromium (Cr), iron (Fe), magnesium (Mg), strontium (Sr), vanadium (V), a rare earth element, or a combination thereof; D is oxygen (O), fluorine (F), sulfur (S), phosphorus (P), or a combination thereof; E is cobalt (Co), manganese (Mn), or a combination thereof; M is fluorine (F), sulfur (S), phosphorus (P), or a combination thereof; G is aluminum (Al), chromium (Cr), manganese (Mn), iron (Fe), magnesium (Mg), lanthanum (La), cerium (Ce), strontium (Sr), vanadium (V), or a combination thereof; Q is titanium (Ti), molybdenum (Mo), manganese (Mn), or a combination thereof; Z is chromium (Cr), vanadium (V), iron (Fe), scandium (Sc), yttrium (Y), or a combination thereof; and J is vanadium (V), chromium (Cr), manganese (Mn), cobalt (Co), nickel (Ni), copper (Cu), or combinations thereof.

The positive active material layer may further include a binder. The binder strongly binds positive active material particles to each other and to a current collector. Suitable binders are known in the art, and can be selected based on considerations such as stability, availability, processability, and like considerations, without undue experimentation. Examples of the binder include polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber ("SBR"), acrylated SBR, epoxy resin, or nylon, but the binder is not limited thereto. A combination comprising at least one of the foregoing may be used.

The current collector may comprise Al or Cu, but are not limited thereto.

The positive active material layer may be formed by coating a positive active material composition on a current collector, wherein the positive active material composition is prepared by combining a positive active material and a binder (and optionally further including a conducting agent) in a solvent. The method of manufacturing the positive electrode can be determined by one of ordinary skill in the art without undue experimentation, and thus a further detailed description thereof will not be provided herein. N-methylpyrrolidione may be used as the solvent. However, any suitable solvent may be used.

The negative electrode may include a negative active material layer and a current collector.

The negative active material may comprise natural graphite, a silicon/carbon complex, $SiO_x$, silicon metal, a silicon thin film, lithium metal, a lithium alloy, a carbonaceous material, graphite, or a combination thereof. For example, the lithium alloy may be a lithium titanate. Examples of the lithium titanate include a lithium titanate having a spinel structure, a lithium titanate having an anatase structure, or a lithium titanate having a ramsdellite structure. For example, the negative active material may be $Li_{4-x}Ti_5O_{12}$ wherein $0 \leq x \leq 3$. Alternatively, the negative active material may be $Li_4Ti_5O_{12}$. However, any suitable material may be used.

A binder and a solvent of a negative active material composition may be the same as that disclosed for the positive active material composition. A conducting agent that may be optionally added to the negative active material layer composition may include carbon black, ketjen black, acetylene black, artificial graphite, natural graphite, copper powder, nickel powder, aluminum powder, silver powder, polyphenylene, or a combination thereof. However, any suitable conducting agent may be used.

A plasticizer may be further added to the positive active material composition and the negative active material composition in order to form a pore in an electrode plate. Representative plasticizers include ethylene carbonate, propylene carbonate, or dimethyl carbonate, for example.

A lithium battery may be classified as either a cylindrical type, rectangular type, coin type, or pouch type, according to the shape thereof. A lithium battery may also be classified as either a bulk type or thin film type, according to the size thereof. A lithium battery may be used either as a primary lithium battery or a secondary lithium battery. A method of manufacturing a lithium battery is widely known in the art, so a further detailed description thereof will not be recited here.

According to another exemplary embodiment, a method of manufacturing the electrolyte membrane for a lithium battery comprises: obtaining, for example preparing a metal-organic framework; mixing the metal-organic framework, a (meth) acrylate monomer composition, and a solvent to obtain a mixture; coating the mixture on a substrate to form a coated layer; polymerizing the coated layer to provide a polymerized layer; and impregnating the polymerized layer with a lithium salt and a nonaqueous organic solvent.

In the preparing of the metal-organic framework, any suitable method may be used. In an embodiment the metal-organic framework may be prepared via a substitution reaction between a metal salt and an organic ligand. For example, the metal salt may be zinc nitrate ($Zn(NO_3)_2$), and the organic ligand may be a dicarboxylic acid compound.

The metal-organic framework may have an average particle diameter of about 10 nm to about 10 μm, specifically about 100 nm to about 5 μm, more specifically about 500 nm to about 1 μm.

In mixing the metal-organic framework, the (meth)acrylate monomer composition, and the solvent to obtain the mixture, polyethylene glycol diacrylate ("PEGDA") or polyethylene dimethacrylate ("PEGDMA") may be used in the (meth) acrylate monomer composition.

A suitable solvent that may be used to prepare the mixture of the metal-organic framework and the (meth)acrylate monomer composition in the manufacture of the electrolyte membrane may be polar, and may include, for example, dimethylformamide ("DMF"), diethylformamide ("DEF"), methanol, ethanol, n-propanol, isopropanol, 2-butoxyethanol, chlorobenzene, chloroform, or combinations thereof. However, any suitable solvent may be used.

The mixture may further include a polymerization initiator.

A suitable polymerization initiator includes a thermal polymerization initiator, such as azoisobisbutyronitrile, benzoyl peroxide, acetyl peroxide, lauroyl peroxide, or the like, or a photopolymerization initiator, such as ethylbenzoin ether, isopropylbenzoin ether, α-methylbenzoin ethylether, benzoin phenylether, α-acyloxime ester, α,α-diethoxy acetophenone, 1,1-dichloroacetophenone, 2-hydroxy-2-methyl-1-phenylpropane-1-one, 1-hydroxy cyclohexyl phenyl ketone, anthraquinone, 2-anthraquinone, 2-chloroanthraquinone, thioxanthone, isopropyl thioxanthone, chlorothioxanthone, benzophenone, p-chlorobenzophenone, benzyl benzoate, benzoyl benzoate, Michler's ketone, or the like, or a combination thereof. However, any suitable polymerization initiator may be used.

A weight ratio between the metal-organic framework and the (meth)acrylate monomers of the monomer composition may be about 1:0.5 to about 1:1, specifically about 1:0.6 to about 1:0.9, more specifically about 1:0.7 to about 1:0.8.

A weight ratio of the metal-organic framework and the solvent may be about 1:0.1 to about 1:2, specifically about 1:0.2 to about 1:1, more specifically about 1:0.5.

When the weight ratio between the metal-organic framework and the (meth)acrylate monomers of the monomer composition is within the foregoing range, it may be easier to form the lithium ion electrolyte membrane, and the lithium ion conductivity may be increased.

In coating the mixture on the substrate, any of a variety of coating methods, such as spray coating, spin coating, casting, or doctor blade coating, for example may be used. In an embodiment, a doctor blade coating method may be used to coat the mixture onto the substrate.

The polymerizing may include heating and/or irradiating the coated layer. The heating and/or the irradiating may include irradiating with ultraviolet ("UV"), electron beam, or X-ray light.

The heating may be performed at a temperature of about 80° C. to about 140° C., specifically about 100° C. to about 120° C., more specifically at about 100° C.

The method of manufacturing the electrolyte membrane may further include drying the polymerized layer before impregnating of the polymerized layer with the lithium salt and the nonaqueous organic solvent. While not wanting to be bound by theory, it is believed that the drying may substantially or effectively prevent the solvent, which may be confined in the metal-organic framework, from hindering the permeation of the electrolyte thereinto.

Hereinafter, an embodiment will be disclosed in further detail with reference to the following examples. These examples are not intended to limit the purpose and scope of the embodiments.

EXAMPLES

Example 1

Preparation of Metal-Organic Framework (MOF-5, $Zn_4O(C_8H_4O_4)_3$)

A 5.065 gram (g) (30.5 millimole (mmol)) quantity of terephthalic acid and 8.5 milliliters (mL) of triethyl amine were dissolved in 400 mL of dimethylformamide ("DMF") to obtain an organic solution. A 16.99 g (77.4 mmol) quantity of $Zn(OAc)_2.2H_2O$ was dissolved in 500 mL of DMF to obtain a Zn salt solution. The Zn salt solution was poured into the organic solution, followed by stirring for about 2.5 hours to obtain a precipitate. The resulting precipitate was washed and immersed in 250 mL of DMF overnight. After being washed a second time, the resulting precipitate was immersed in 350 mL of $CH_3Cl$, wherein the solvent was exchanged three times for seven days. Then, the solvent remaining in the precipitate was removed by drying in vacuum at about 120° C. for about 6 hours, thereby preparing a metal-organic framework MOF-5, having the formula $Zn_4O(C_8H_4O_4)_3$.

Example 2

Preparation of Metal-Organic Framework (MIL-78, $Y(C_9H_3O_6)$)

A 0.347 g quantity of $Y(NO_3)_3 \cdot 4H_2O$ (FW 346.98), 0.21 g of trimesic acid (FW 210.14), and 0.08 g of NaOH (FW 40) were put in 7.2 g of $H_2O$ (FW 18), after which the mixture was stirred overnight, and was then placed in a Teflon-coated pressure vessel for reaction at about 220° C. for 5 days. The resulting reaction product was washed and dried, thereby preparing a metal-organic framework MIL-78, having the formula $Y(C_9H_3O_6)$.

Example 3

Preparation of Electrolyte Membrane (MOF-5 ($Zn_4O(C_8H_4O_4)_3$)) for Lithium Battery The metal-organic framework MOF-5 and polyethylene glycol diacrylate (Mn=700) were combined in a weight ratio of 1:1 and were mixed in chloroform in a weight ratio of MOF-5 to chloroform of 1:0.5. The resulting mixture was coated on a Teflon substrate using a 1 mm doctor blade. The coated compound was cured at a temperature of about 100° C. to about 120° C. overnight to form a film. The film was dried in vacuum at about 80° C. for about 12 hours. The dried film was immersed in a mixed solvent of ethylene carbonate and diethylcarbonate (in a volume ratio of 3:7) and a 1.3M $LiPF_6$ solution overnight, withdrawn, and dried at room temperature in air overnight, thereby manufacturing an electrolyte membrane for a lithium battery. The electrolyte membrane had a thickness of about 500 µm.

Example 4

Preparation of Electrolyte Membrane (MOF-5 ($Zn_4O(C_8H_4O_4)_3$)) for Lithium Battery An electrolyte membrane for a lithium battery was manufactured in the same manner as in Example 3, except that the MOF-5 and the polyethylene glycol diacrylate were used in a weight ratio of 1:0.5. The electrolyte membrane had a thickness of about 500 µm.

Example 5

Preparation of Electrolyte Membrane (MIL-78 ($Y(C_9H_3O_6)$)) for a Lithium Battery An electrolyte membrane for a lithium battery was manufactured in the same manner as in Example 3, except that MIL-78 and polyethylene glycol diacrylate were used in a weight ratio of 1:1. The electrolyte membrane had a thickness of about 500 µm.

Example 6

Preparation of Electrolyte Membrane (MIL-78 ($Y(C_9H_3O_6)$)) for a Lithium Battery An electrolyte membrane for a lithium battery was manufactured in the same manner as in Example 3, except that MIL-78 and polyethylene glycol diacrylate were used in a weight ratio of 1:0.5. The electrolyte membrane had a thickness of about 500 µm.

Comparative Example 1

Preparation of Electrolyte Membrane (Polyethylene Electrolyte Membrane) for a Lithium Battery A porous polyethylene film separator (manufactured by Celgard) was dried in vacuum at about 80° C. for about 12 hours. The dried film was immersed in a mixed solvent of ethylene carbonate and diethylcarbonate (in a volume ratio of 3:7) and a 1.3M $LiPF_6$ solution overnight, withdrawn, and dried at room temperature in air overnight, thereby manufacturing an electrolyte membrane for a lithium battery. The electrolyte membrane had a thickness of about 15 µm.

Thermogravimetric Analysis ("TGA")

To analyze thermal properties of the electrolyte membranes of Examples 1, 2, 3, and 5 and Comparative Example 1, thermogravimetric analysis ("TGA") was performed using a thermogravimetric analyzer (TA Instruments Model TGA 2950). The electrolyte membranes were equilibrated at about 50° C. in a nitrogen atmosphere before being analyzed, and changes in weight thereof were measured at a ramp rate of 2 degrees centigrade per minute (° C./min) and an air current of 300 mL/min.

Figure 4:
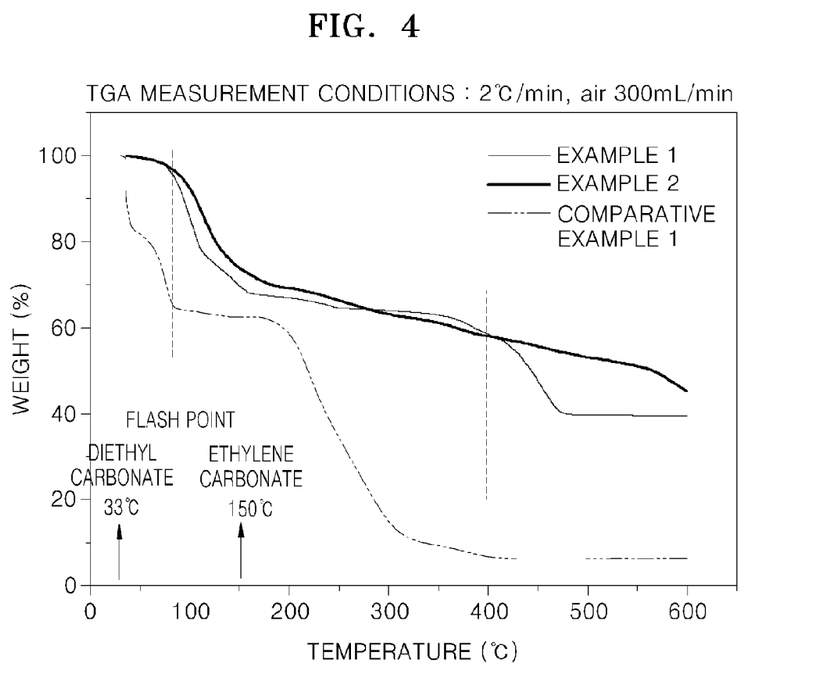
FIG. 4 is a graph of weight (percent) versus temperature (degrees centigrade) illustrating thermogravimetric analysis ('TGA") results for the electrolyte membranes manufactured in Examples 1 and 2 and Comparative Example 1.
Figure 5:
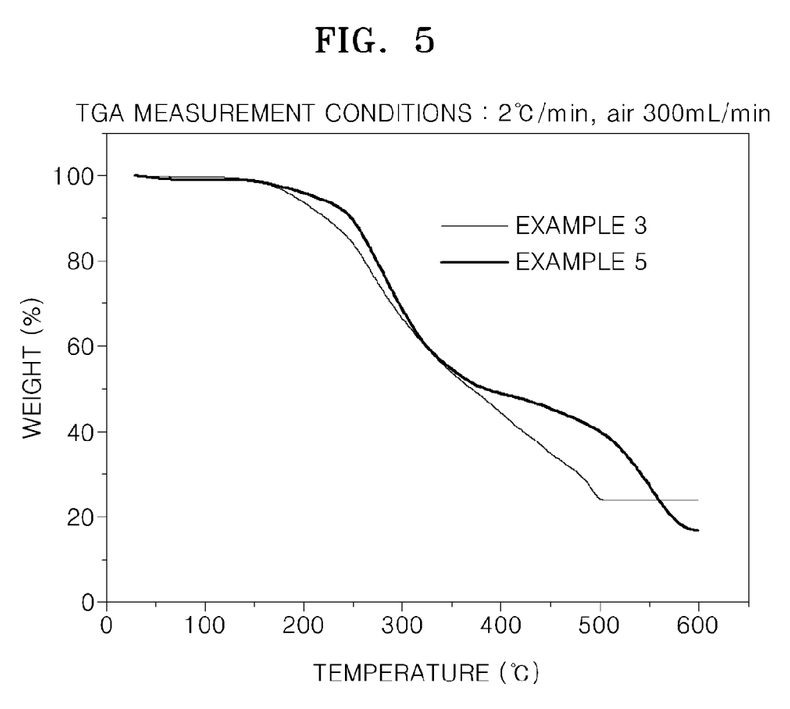
FIG. 5 is a graph of weight (percent) versus temperature (degrees centigrade) illustrating TGA results for the electrolyte membranes manufactured in Examples 3 and 5.

The electrolyte membranes of Examples 1 and 2 were immersed in a liquid electrolyte (including 1.3M $LiPF_6$ in a mixed solvent of ethylene carbonate and diethyl carbonate in a volume ratio of 3:7 for about 12 hours, and were then dried at room temperature in air for one day before the analysis. The analysis results are shown in FIG. 4. The electrolyte membranes of Examples 3 and 5 were analyzed after being vacuum dried, without being immersed in the electrolyte solution. The results are shown in FIG. 5.

Referring to FIG. 4, for the electrolyte membrane of Comparative Example 1, the diethyl carbonate electrolyte was mostly removed at a temperature of about 80° C. or less. However, the electrolyte membranes of Example 1 and 2 retained the electrolyte solvent of ethylene carbonate and diethylcarbonate even at about 80° C., and the electrolyte solvent was slowly removed at 80° C. or higher.

For the electrolyte membrane of Comparative Example 1, the polyethylene film began to decompose at about 200° C., as evidenced by the weight decrease shown in FIG. 4 for the TGA results corresponding to Comparative Example 1. However, for the electrolyte membranes of Examples 1 and 2, their metal-organic framework began to decompose at about 400° C., as evidenced by the weight decrease shown in FIG. 4 for the TGA results corresponding to Examples 1 and 2.

These results indicate that the electrolyte membranes of Examples 1 and 2 have better solvent stability than the electrolyte membrane of Comparative Example 1. Also, referring to FIG. 5, the matrix structures of the electrolyte membranes of Examples 3 and 5 began to thermally decompose at about 150° C., and, while not wanting to be bound by theory, it is believed that the matrix components that decomposed at above 150° C. were cured polymers.

Lithium Ion Conductivity Measurement

Figure 6:
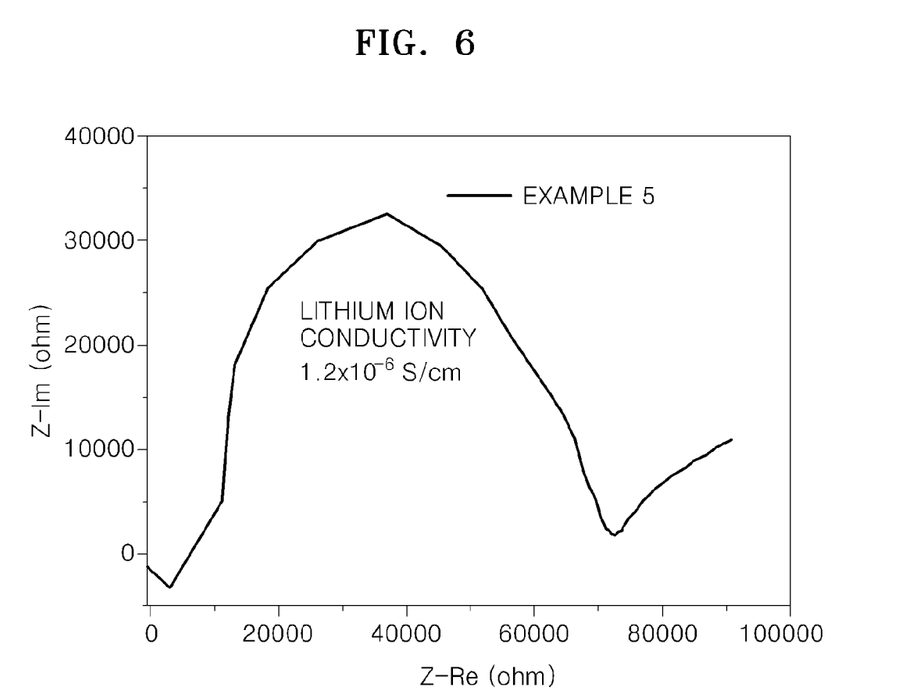
FIG. 6 is a graph of imaginary impedance (Z-Im, ohms) versus real impedance (Z—Re, ohm) illustrating lithium ion conductivity of the electrolyte membrane of Example 5.
Figure 7:
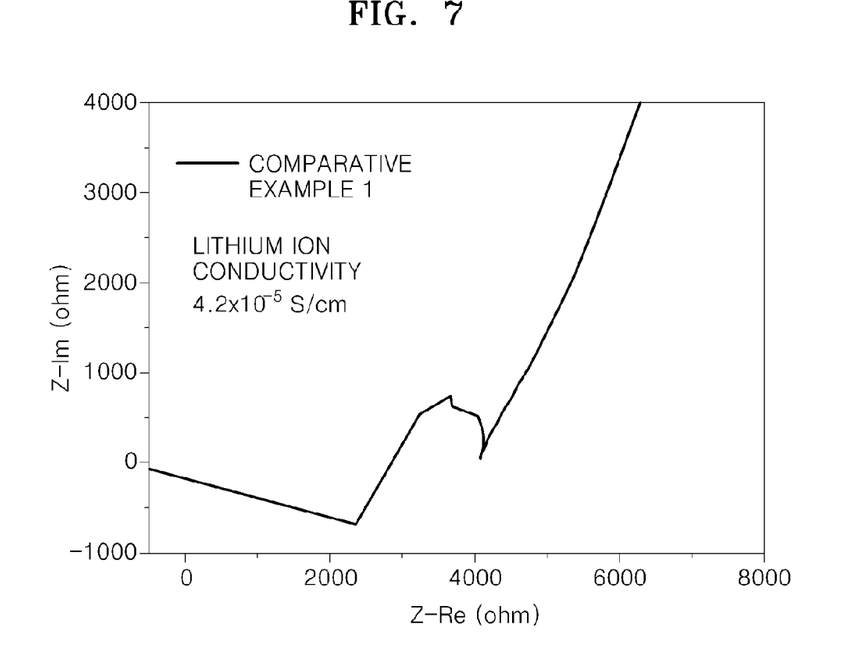
FIG. 7 is a graph of imaginary impedance (Z-Im, ohms) versus real impedance (Z—Re, ohm) illustrating lithium ion conductivity of the electrolyte membrane of Comparative Example 1.

The electrolyte membrane of Example 5, including MIL-78, and the electrolyte membrane of Comparative Example 1, including the polyethylene film, were immersed in a liquid electrolyte (including 1.3M $LiPF_6$ in a mixed solvent of ethylene carbonate and diethyl carbonate in a volume ratio of 3:7) at about 25° C. for about 10 hours and withdrawn therefrom. Then, the liquid electrolyte was wiped off from the surfaces of the electrolyte membranes. Each of the electrolyte membranes was disposed between a pair of metal electrodes (stainless steel ("SUS"), having a rod diameter of 10 mmϕ to form an electrochemical cell. An alternating ("AC") voltage was applied between the metal electrodes of the electrochemical cell to measure complex impedance according to an AC impedance method. Based on a real impedance intercept in a Cole-Cole plot of the complex impedance, the thickness of each of the electrolyte membranes of Example 5 and Comparative Example 1, and the area of the metal electrode, a lithium ion conductivity of the electrolyte membrane was calculated. The results are shown in FIGS. 6 and 7. The measurement was performed using a PAR potentiostat 2273.

Referring to FIGS. 6 and 7, the electrolyte membrane of Example 5 had a specific resistance that is about 35 times higher than the electrolyte membrane of Comparative Example 1, indicating that the electrolyte membrane of Example 5 provides a significant decrease in specific resistance as compared to a commercially available electrolyte membrane, which is typically about 10 to 100 times higher. These results also indicate that the electrolyte membrane of Example 5 had an intermediate level of lithium ion conductivity. However, the lithium ion conductivity may be further improved by varying the matrix composition. Therefore, a structurally stable electrolyte membrane may be manufactured without a reduction or with an increase in lithium ion conductivity.

As described above, according to disclosed embodiments, an electrolyte membrane for a lithium battery may have good lithium ion conductivity, and at the same time have high structural stability.

It should be understood that the exemplary embodiments described herein should be considered in a descriptive sense only and not for purposes of limitation. Descriptions of features or aspects within each embodiment should be considered as available for other similar features or aspects in other embodiments.

What is claimed is:

1. An electrolyte membrane for a lithium battery, the electrolyte membrane comprising:
   a matrix comprising a polymerization product of a (meth)acrylate monomer composition; and
   a porous metal-organic framework dispersed in the matrix, wherein the metal-organic framework comprises
   a compound comprising a metal ion or metal ion cluster chemically bound to an organic ligand wherein the metal ion is $Ti^{4+}$, $Y^{3+}$, or a combination thereof, wherein the organic ligand is a substituted or unsubstituted aromatic polycarboxylic acid ligand, and
   a liquid electrolyte comprising a lithium salt and a non-aqueous organic solvent.

2. The electrolyte membrane of claim 1, wherein the liquid electrolyte is retained in the pores of the metal-organic framework.

3. The electrolyte membrane of claim 2, wherein the pores have an average diameter of about 0.5 nanometers to about 3 nanometers.

4. The electrolyte membrane of claim 1, wherein the (meth)acrylate monomer composition comprises a poly(ethyleneglycol) diacrylate, a poly(propylene glycol) diacrylate, a poly(ethyleneglycol) dimethacrylate, a poly(propylene glycol) dimethacrylate, a poly(ethyleneglycol)urethane diacrylate, a poly(ethyleneglycol)urethane dimethacrylate, a polyester diacrylate, a polyester dimethacrylate, a poly(ethyleneglycol) urethane triacrylate, a poly(ethyleneglycol)urethane trimethacrylate, a trimethylolpropane triacrylate, a trimethylolpropane trimethacrylate, an ethoxy-substituted trimethylolpropane triacrylate, a propoxy-substituted trimethylolpropane triacrylate, glyceryl triacrylate, glyceryl trimethacrylate, tetramethylolpropane tetraacrylate, di(trimethylolpropane) tetraacrylate, or combination thereof.

5. The electrolyte membrane of claim 1, wherein the organic ligand is a substituted or unsubstituted aromatic dicarboxylic acid ligand, a substituted or unsubstituted aromatic tricarboxylic acid ligand, or a combination thereof.

6. The electrolyte membrane of claim 1, wherein the lithium salt is $LiClO_4$, $LiCF_3SO_3$, $LiBF_4$, $LiN(CF_3SO_2)_2$, $LiPF_6$, $LiAsF_6$, $LiSbF_6$, $LiPF_3(CF_2CF_3)_3$, or a combination thereof.

7. The electrolyte membrane of claim 1, wherein the non-aqueous organic solvent is ethylene carbonate, propylene carbonate, butylene carbonate, dimethyl carbonate, diethyl carbonate, 1-fluoroethylene carbonate, sulfolane, 1,3-dioxane, γ-butyrolactone, or a combination thereof.

8. The electrolyte membrane of claim 1, wherein the organic ligand is a substituted or unsubstituted C6 to C30 aromatic dicarboxylic acid ligand, a substituted or unsubstituted C6 to C30 aromatic tricarboxylic acid ligand, or a combination thereof.

9. A lithium battery comprising:
   a positive electrode;
   a negative electrode; and
   an electrolyte,
   wherein the electrolyte is a membrane comprising
   a matrix comprising a polymerization product of a (meth)acrylate monomer composition, and
   a porous metal-organic framework dispersed in the matrix, wherein the metal-organic framework comprises
   a compound comprising a metal ion or metal ion cluster which is chemically bound to an organic ligand wherein the metal ion is $Zn^{2+}$, $Ti^{4+}$, $V^{4+}$, $V^{3+}$, $V^{2+}$, $Y^{3+}$, $Zr^{4+}$, a trivalent lanthanide, or a combination thereof, and wherein the organic ligand is a substituted or unsubstituted aromatic polycarboxylic acid ligand, and
   a liquid electrolyte comprising a lithium salt and a non-aqueous organic solvent.

10. The electrolyte membrane of claim 1, wherein the organic ligand chemically bonds adjacent metal ions or metal ion clusters.

11. The electrolyte membrane of claim 1, wherein a weight ratio between the metal-organic framework and the (meth)acrylate composition is 1:0.5 to about 1:1.

12. The electrolyte membrane of claim 11, wherein the matrix is a polymerization product of a (meth)acrylate monomer composition consisting of a di(meth)acrylate, and wherein the di(meth)acrylate is a poly(ethyleneglycol) diacrylate, a poly(propyleneglycol) diacrylate, a poly(ethyleneglycol) dimethacrylate, a poly(propyleneglycol) dimethacrylate, or a combination thereof.

13. The electrolyte membrane of claim 12, wherein the metal ion is $Y^{3+}$.

14. The electrolyte membrane of claim 8, wherein a weight ratio between the metal-organic framework and the (meth)acrylate composition is 1:0.5 to about 1:1.

15. The electrolyte membrane of claim 1, wherein the metal ion is $Y^{3+}$.

16. The electrolyte membrane of claim 1, wherein the metal ion is $Ti^{4+}$.

17. The lithium battery of claim 9, wherein the organic ligand is an unsubstituted C6 to C30 aromatic dicarboxylic acid ligand, an unsubstituted C6 to C30 aromatic tricarboxylic acid ligand, or a combination thereof.

18. The lithium battery of claim 9, wherein the liquid electrolyte is retained in the pores of the metal-organic framework.

19. The lithium battery of claim 18, wherein the pores have an average diameter of about 0.5 nanometers to about 3 nanometers.

20. The lithium battery of claim 9, wherein the (meth) acrylate monomer composition comprises a poly(ethyleneglycol) diacrylate, a poly(propylene glycol) diacrylate, a poly(ethyleneglycol) dimethacrylate, a poly(propylene glycol) dimethacrylate, a poly(ethyleneglycol)urethane diacrylate, a poly(ethyleneglycol)urethane dimethacrylate, a polyester diacrylate, a polyester dimethacrylate, a poly(ethyleneglycol) urethane triacrylate, a poly(ethyleneglycol)urethane trimethacrylate, a trimethylolpropane triacrylate, a trimethylolpropane trimethacrylate, an ethoxy-substituted trimethylolpropane triacrylate, a propoxy-substituted trimethylolpropane triacrylate, glyceryl triacrylate, glyceryl trimethacrylate, tetramethylolpropane tetraacrylate, di(trimethylolpropane)tetraacrylate, or a combination thereof.

21. The lithium battery of claim 9, wherein the organic ligand is a substituted or unsubstituted aromatic dicarboxylic acid ligand, a substituted or unsubstituted aromatic tricarboxylic acid ligand, or a combination thereof.

22. A method of manufacturing an electrolyte membrane for a lithium battery, the method comprising:
providing a porous metal-organic framework;
mixing the metal-organic framework, a (meth)acrylate monomer composition, and a solvent to obtain a combination;
coating the mixture on a substrate to form a coated layer;
polymerizing the coated layer to provide a polymerized layer; and impregnating the polymerized layer with a liquid electrolyte comprising a lithium salt and a nonaqueous organic solvent to manufacture the electrolyte membrane, wherein the electrolyte membrane comprises
a matrix comprising a polymerization product of the (meth)acrylate monomer composition; and
the metal-organic framework dispersed in the matrix, wherein the metal-organic framework comprises
a compound comprising a metal ion or metal ion cluster chemically bound to an organic ligand wherein the metal ion is $Ti^{4+}$, $Y^{3+}$, or a combination thereof, wherein the organic ligand is a substituted or unsubstituted aromatic polycarboxylic acid ligand, and
wherein the liquid electrolyte comprises the lithium salt and the nonaqueous organic solvent.

23. The method of claim 22, wherein the (meth)acrylate monomer composition comprises a poly(ethyleneglycol) diacrylate, a poly(propylene glycol) diacrylate, a poly(ethyleneglycol) dimethacrylate, a poly(propylene glycol) dimethacrylate, a poly(ethyleneglycol)urethane diacrylate, a poly(ethyleneglycol)urethane dimethacrylate, a polyester diacrylate, a polyester dimethacrylate, a poly(ethyleneglycol) urethane triacrylate, a poly(ethyleneglycol)urethane trimethacrylate, a trimethylolpropane triacrylate, a trimethylolpropane trimethacrylate, an ethoxy-substituted trimethylolpropane triacrylate, a propoxy-substituted trimethylolpropane triacrylate, glyceryl triacrylate, glyceryl trimethacrylate, tetramethylolpropane tetraacrylate, di(trimethylolpropane)tetraacrylate, or a combination thereof.

24. The method of claim 22, wherein a weight ratio between the metal-organic framework and the (meth)acrylate monomer of the monomer composition is about 1:0.5 to about 1:1.

\* \* \* \* \*